United States Patent
Gunay et al.

(10) Patent No.: US 6,319,014 B1
(45) Date of Patent: Nov. 20, 2001

(54) HOLDER FOR THE SECURING OF A SUN VISOR

(75) Inventors: Tarik Gunay, Neuss; Wulf Bramesfeld, Wulfrath; Udo Diedrich, Ennepetal, all of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/510,399

(22) Filed: Feb. 22, 2000

(30) Foreign Application Priority Data

Mar. 15, 1999 (DE) ................................. 199 11 393

(51) Int. Cl.[7] ................................................. H01R 33/00
(52) U.S. Cl. ............................................... 439/34; 362/144
(58) Field of Search ........................... 439/34; 296/97.11, 296/97.12, 97.13

(56) References Cited

U.S. PATENT DOCUMENTS

| | | | |
|---|---|---|---|
| 1,303,464 | * 5/1919 | Davis | 439/699.1 |
| 2,674,723 | * 4/1954 | Hurlbut | 439/699.1 |
| 4,720,132 | * 1/1988 | Ebert et al. | 362/144 |
| 6,095,840 | * 8/2000 | Yamaguchi et al. | 439/34 |
| 6,139,083 | * 10/2000 | Fischer et al. | 296/97.11 |

FOREIGN PATENT DOCUMENTS

| | | |
|---|---|---|
| 7702394 | 5/1977 | (DE) . |
| 3536471A1 | 10/1985 | (DE) . |
| 3713425A1 | 4/1987 | (DE) . |
| 19608566A1 | 3/1996 | (DE) . |
| 19647918A1 | 11/1996 | (DE) . |

* cited by examiner

*Primary Examiner*—Neil Abrams
(74) *Attorney, Agent, or Firm*—Patrick M. Griffin

(57) ABSTRACT

A holder for the securing of an electrified sun visor at a vehicle has a mount for a securing arm of the sun visor and mounting means for mounting the holder at the vehicle. The holder serves for the connection of a vehicle-side wiring harness to a conductor.

18 Claims, 3 Drawing Sheets

HOLDER FOR THE SECURING OF A SUN VISOR

TECHNICAL FIELD

The invention relates to a holder for the securing of an electrified sun visor at a vehicle, with the holder having a mount for a securing arm of the sun visor and mounting means for mounting the holder at the vehicle.

BACKGROUND OF THE INVENTION

The electrical connection for an electrified sun visor usually comprises a cable with a cable connector. The cable is conducted in a cavity in the roof and hangs downwardly with an excess length into the vehicle interior. A cable with a cable connector which is passed through the securing arm is likewise connected at the sun visor. During the assembly the two cable connectors must first be plugged together; afterwards the excess length of the cable must be led back into the cavity in the roof and then the holder of the sun visor must be secured at the roof by means of screws.

The attachment of the sun visor is time consuming and prone to errors, since if the excess length is not correctly laid into the cavity in the roof, the cable can be damaged by the screws. In addition the entire work step requires much manual labor.

SUMMARY OF THE INVENTION

The object of the invention is thus to design a holder of the initially named kind in such a manner that it is simpler and more economical to manufacture and can also be integrated into automated procedures.

This object is satisfied in a holder of the initially named kind in that the latter is designed as a plug contact housing at its rear side which points away from the vehicle interior; and in that a counter-piece is provided into which the plug contact housing is insertable and which serves for the connection to a conductor.

As a result of the design in accordance with the invention the attachment of the sun visor and the connection of the cables can be combined. The wiring harness or the cable associated with the roof respectively is attached together with the counter-piece at the roof sheet metal lamina. Then the ceiling is secured in the vehicle and the sun visor attached. The attaching of the sun visor and the producing of the electrical connections is merely a single, simple and self positioning plugging process, which can be carried out in the shortest time and in an automated manner.

Advantageous embodiments of the invention are described in the description, in the drawings and in the subordinate claims.

Thus in accordance with a first advantageous embodiment at least two spring contacts can be arranged in the plug contact housing, at the ends of which conductors for the connection of an electrical device which is located in the sun visor are connected. The electrical device can be a switch, a lighting means or any other desired electrical component. In this embodiment the sun visor can be completely pre-assembled together with the securing arm, the holder and the conductors, through which a prefabricated unit results, which need merely be inserted into the counter-piece which is provided in accordance with the invention. After a fixing through for example securing screws not only is the sun visor completely mounted at the vehicle, but the required electrical connections are also made without additional assembly time being required for this.

It is advantageous if the counter-piece has securing means for the securing at a carrier sheet metal lamina and/or a ceiling. Securing means of this kind can for example be snap guides, latching hooks or the like, with the help of which the counter-piece can be secured in a simple manner at the securing sheet metal lamina and/or the ceiling. For example two parallel and outwardly open rail sections can be provided, so that the counter-piece can be pressed into a for example rectangular cut-out in a mounting sheet metal lamina, so that the counter-piece is held firmly and non-losably in the opening of the mounting sheet metal lamina.

In accordance with a further advantageous embodiment the plug contact housing and the counter-piece can be brought into a pre-assembly position via a clamp seating. In this way the sun visor can be inserted into the counter-piece during the assembly and remains fixed in the latter until the holder is mounted at a carrier sheet metal lamina with securing screws.

In accordance with a further advantageous embodiment the counter-piece has a mount for a conductor, in particular for a flexible conductor path, which preferably has at least one passage slit and at least one holder knob. In this embodiment the counter-piece can be connected to the conductor from the beginning so that the counter-piece which is contacted to the conductor can be inserted into a ceiling and/or a mounting sheet metal lamina. To the extent that the counter-piece has a passage slit for a flexible conductor path the latter can be introduced into the interior of the counter-piece, through which a contacting between the sun visor and the conductor automatically takes place when the plug contact housing is inserted into the counter-piece. Through an additionally provided holder knob the conductor piece which is led through the inner space of the counter-piece can be fixed in that the holder knob is pushed through an opening in the conductor and where appropriate widened afterwards.

It is particularly advantageous if the plug contact housing is designed as a pin-like projection which projects from a base plate. In this way a centering in the correct mounting position can be achieved in a simple way during the mounting of the holder at the vehicle.

In accordance with a further advantageous embodiment the holder has a cylindrical projection onto which the holder arm can be plugged, with the cylindrical projection merging into the plug-like projection which projects from the rear side of the base plate. In this embodiment chambers can be provided in the interior of the projections in order to receive spring contacts which are connected on the one hand to an electrical device in the interior of the sun visor and which serve on the other hand for the contacting with the conductor.

Through chambers which are provided in the plug contact housing for the reception of spring contacts the latter can be provided insulated from one another as an integral constituent of the holder. In this the chambers can have a cut-out for the passage of a part of a spring contact so that this part projects from the outer contour of the plug contact housing and the counter-piece automatically produces a conducting connection to the conductor which is provided therein when the plug contact housing is inserted.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
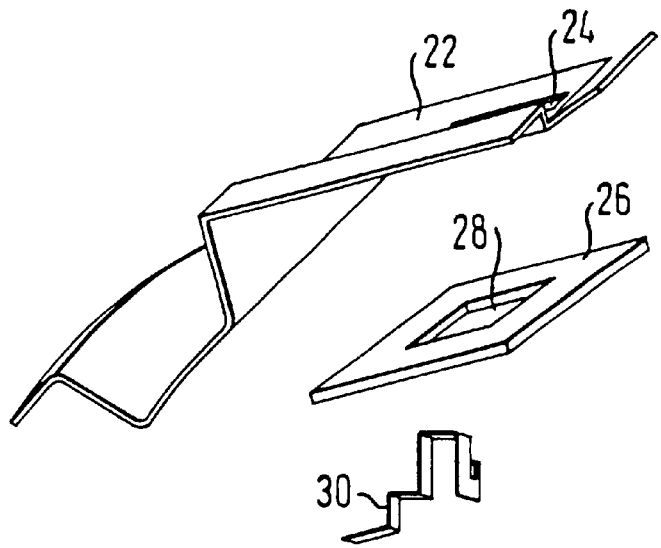
FIG. 1 is an exploded illustration of a holder in accordance with the invention.
Figure 1:
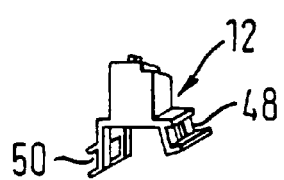
Figure 1:
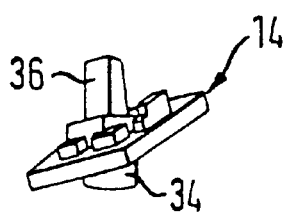
Figure 1:
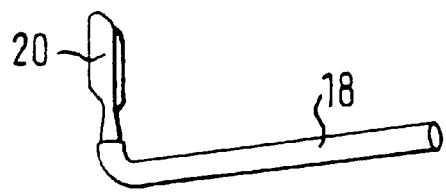
Figure 1:
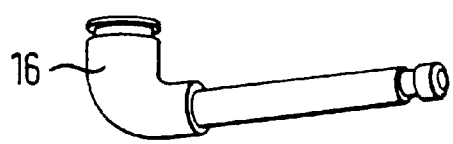

FIG. 1 shows an exploded illustration of a holder in accordance with the invention which in the illustrated exemplary embodiment has a mount 14 for a securing arm 16 of a non-illustrated sun visor and a counter-piece 12 for the mount 14. A bipolar conductor 18, which can for example be connected to a switch which is provided at the sun visor, is connected to spring contacts 20 at its left end in FIG. 1. The conductor is passed through a securing arm 16 and the spring contacts 20 are pushed into the mount 14, as will be explained in more detail in the following. The securing arm 16 with the sun visor secured to it in the conventional way can then for example be pivotally secured with the help of a securing ring in the holder 14, through which a pre-assembled unit is created.

For mounting this unit at a vehicle a cut-out 24 is provided in a carrier sheet metal lamina 22 of the vehicle. A preferably square cut-out 28 is provided in a vehicle ceiling 26. It is evident that only sections of the carrier sheet metal lamina 22 and of the vehicle ceiling 26 are illustrated in the figures for a simpler illustration.

Prior to the mounting of the vehicle ceiling 26 a conductor, which is executed as a flat wire 30 in the illustrated exemplary embodiment, is connected to the counter-piece 12 in such a manner that the conductor lies free in the interior of the counter-piece 12. Through this an electrical contacting takes place automatically when the mount 14 is plugged into the counter-piece 12. The counter-piece 12, which is connected to the conductor 30, is clipped in into the cut-out 28 of the vehicle ceiling 26, whereupon the vehicle ceiling can be mounted at the lower side of the carrier sheet metal lamina 22. In this the counter-piece 12 centers itself in the cut-out 24 of the carrier sheet metal lamina 22. Then the pre-assembled sun visor with the mount 14 located at it can be plugged in into the counter-piece 12 so that the mount 14 is held by a clamp seating in the counter-piece 12. Then the mount 14 is screwed to the carrier sheet metal lamina 22 with two securing screws.

Figure 2:
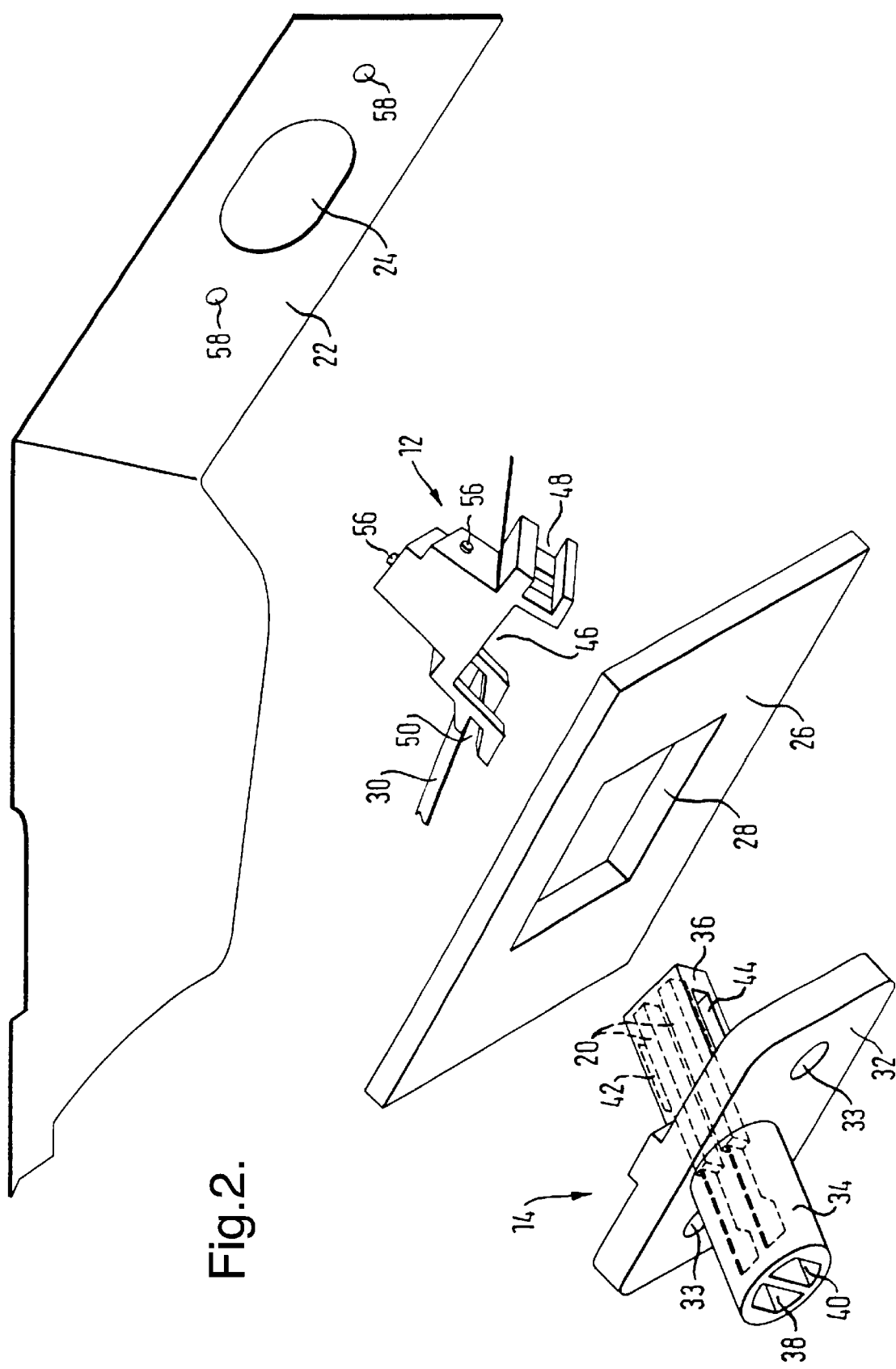
FIG. 2 is an enlarged exploded illustration similar to that of FIG. 1.

FIG. 2 shows an enlarged exploded illustration of a mount 14 and of a counter-piece 12. As can be recognized, the mount 14 has a base plate 32 in which two bores 33 for the passage of mounting screws (not illustrated) are provided. A cylindrical projection 34, which is molded on in a single piece and onto which the securing arm 16 can be plugged on, projects from the lower side of the mounting plate 32, i.e. the side directed towards the vehicle interior. A plug contact housing 36 is molded on at the side of the base plate 32 which points away from the vehicle interior and is designed as a pin-like projection which merges into the cylindrical projection 34. Two separate chambers 38, 40 in which in each case a spring contact 20 is accommodated which can be latched in a known way in the chamber are provided in the plug contact housing 36 and the cylindrical projection 34. The conductor 18 is crimped on at the left end of each spring contact 20 in FIG. 2. The plug contact housing 36 has cut-outs 42, 44 at one side wall through which a part of each spring contact 20 can emerge in order to produce an electrical connection to the flat wire 30.

The counter-piece 12 has a reception chamber 46 which is adapted to the outer contour of the plug contact housing 36 and has two side sections 48, 50 which extend parallel to one another, with the help of which the counter-piece 12 can be clipped into the cut-out 28 of the ceiling 26.

As shown in particular in FIGS. I and 4, the flat wire 30 is pre-shaped in such a manner that it substantially corresponds to the outer contour of the counter-piece 12. The flat wire 30 is introduced through a slit 52 into the reception chamber 46 during the pre-assembly in such a manner that electrically non insulated regions of the bipolar flat wire point into the reception chamber 46. The end of the flat wire 30 is led at the lower side of the reception chamber 46 out of the latter through a further slit 54 and parallel to the outer wall of the counter-piece 12. A plurality of knobs 56 are provided at the outer side of the counter-piece 12 which can serve for the fixing of the flat wire 30 and can be thermally deformed.

In the following the complete assembly of a sun visor with the holder in accordance with the invention will again be described.

As FIG. 1 shows, the conductor 18, which is connected at its one end to an electrical device in the interior of the sun visor, is led through the securing arm 16 during the pre-assembly. At its other end the spring contacts 20 are crimped on. Then the two spring contacts 20 are introduced into the chambers 38 and 40 of the mount 14 so that they latch in the position illustrated in FIG. 2. Thereupon the securing arm 16 is pushed onto the cylindrical projection 34 and latched in the mount 14. The sun visor and the mount 14 which is secured to it now form a completely pre-assembled unit.

Figure 4:
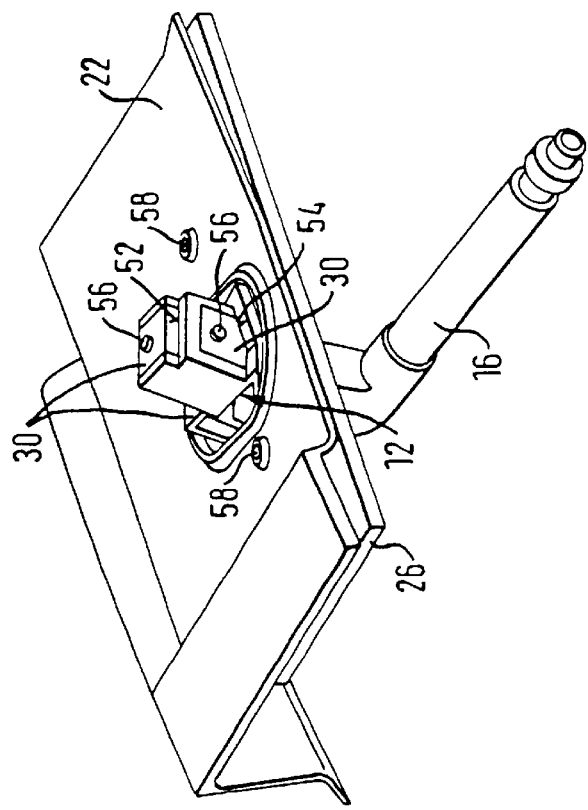
FIG. 4 is a view of the side of the holder of FIG. 3 facing away from the vehicle interior (rear side).

The flat wire 30, which can be a constituent of the wiring harness, is brought into the shape illustrated in FIG. 1 and secured to the counter-piece 12 as illustrated in FIG. 4 in such a manner that electrically non insulated regions point into the interior of the reception chamber 46 of the counter-piece 12. In this the fixing of the conductor at the counter-piece takes place through the knobs 56. In this the conductor 30 is introduced into the reception chamber 46 through the slit 52 and led out of the latter again through the further slit 54.

The counter-piece 12, which is connected to the conductor 30, is then clipped in into the cut-out 28 of the vehicle ceiling 26, with the rail sections 48 and 50 taking up the edges of the cut-out 28. The thus pre-assembled vehicle ceiling 26 is now mounted at the lower side of the carrier sheet metal lamina 22 in the vehicle interior. In this the housing of the reception chamber 46 serves for the centering of the carrier sheet metal lamina 22 in the cut-out 24.

The pre-assembled sun visor can now be mounted in the vehicle in that the plug contact housing 36 is inserted into the reception chamber 46 of the counter-piece 12 in such a manner that the free lying sections of the spring contacts 20 contact the flat wire 30 in the interior of the reception chamber. As a result of the spring tension of the spring contacts 20 and the remaining dimensioning the plug contact housing 36 is held by means of a clamp seating in the reception chamber 46 of the counter-piece 12 so that afterwards two mounting screws (not illustrated) can be passed through the bores 33 in the base plate 32 and through the vehicle ceiling 26 and screwed in bores 58 in the carrier sheet metal lamina 22.

Figure 3:
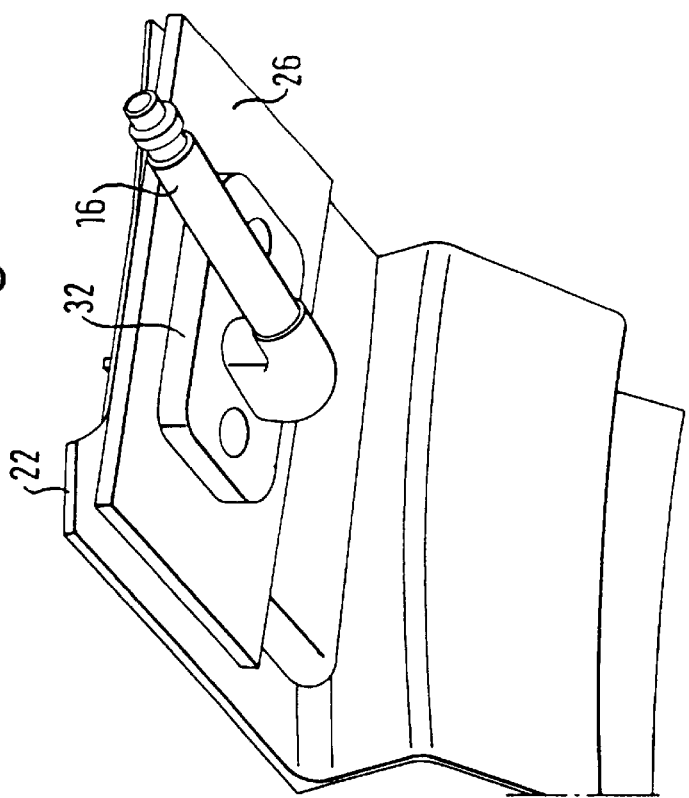
FIG. 3 is a view of a completely mounted holder seen from the vehicle interior.

Merely for the sake of completeness it should be mentioned that the mount 14 and the counter-piece 12 are manufactured of electrically insulating plastic. Furthermore, the electrical conductor 18 is omitted from FIGS. 2 to 4 for simplicity of the illustration.

What is claimed is:

1. A holder for securing an electrified sun visor to a vehicle, the holder comprising:

a securing arm having a first conductor disposed therein;

a mount including a base plate for mounting the holder to a ceiling of the vehicle, a projection projecting from an outer surface of the base plate and including at least one chamber for receiving the first conductor, and a plug contact housing projecting from the outer surface of the base plate and having an outer contour;

a counter-piece mounted to a cutout in the ceiling of the vehicle and having a reception chamber adapted to the outer contour of the plug contact housing such that the plug contact housing is capable of being received within the reception chamber; and a second conductor, a portion of the second conductor being disposed within the reception chamber of the counter-piece, wherein an electrical connection is established between the first conductor and the second conductor when the plug contact housing is passed through the cutout in the ceiling of the vehicle and inserted into the reception chamber of the counter-piece.

2. The holder of claim 1, wherein the second conductor comprises a bipolar flat wire.

3. The holder of claim 2, wherein the bipolar flat wire is disposed within the reception chamber such that a non-insulated portion of the bipolar flat wire is positioned toward the reception chamber.

4. The holder of claim 1, wherein the projection of the mount includes one or more chambers, the first conductor being disposed within the one or more chambers of the mount.

5. The holder of claim 4, further including one or more spring contacts disposed within the one or more chambers of the mount.

6. The holder of claim 5, wherein the one or more spring contacts are disposed within the plug contact housing of the mount.

7. The holder of claim 6, wherein the plug contact housing includes one or more cutouts for enabling a portion of the spring contacts to extend therefrom to establish the electrical connection between the first conductor and the second conductor.

8. A holder for securing an electrified sun visor to a vehicle, the holder comprising:

a securing arm having a first conductor disposed therein;

a mount including a base plate for mounting the holder to a ceiling of the vehicle, a projection projecting from an outer surface of the base plate, and a plug contact housing projecting from the outer surface of the base plate, the mount further including at least one chamber for receiving the first conductor and for receiving one or more contact springs electrically contacting the first conductor, the mount further including an opening for exposing a portion of the one or more contact springs;

a counter-piece mounted to a cutout in the ceiling of the vehicle and a reception chamber capable of receiving the plug contact housing of the mount; and a second conductor, a portion of the second conductor being disposed within the reception chamber of the counter-piece, wherein the exposed portion of the one or more contact springs establish an electrical connection between the first conductor and the second conductor when the plug contact housing is inserted through the ceiling of the vehicle and into the reception chamber of the counter-piece.

9. The holder of claim 8, wherein the second conductor comprises a bipolar flat wire.

10. The holder of claim 9, wherein the bipolar flat wire is disposed within the reception chamber such that a non-insulated portion of the bipolar flat wire is positioned toward the reception chamber.

11. The holder of claim 8, wherein the counter-piece includes a rail section on each side for mounting the counter-piece to the ceiling.

12. A holder for securing an electrified sun visor to a vehicle, the holder comprising:

a securing arm having a first conductor disposed therein;

a mount including a base plate having first outer surface and a second outer surface, a projection projecting from the first outer surface of the base plate, and a plug contact housing projecting from the second outer surface of the base plate, a portion of the first conductor being disposed within a chamber disposed within the projection of the mount, the mount further including a contact spring disposed within the plug contact housing of the mount and being in electrical contact with the first conductor;

a counter-piece mounted into a cutout in the ceiling of the vehicle and including a reception chamber capable of receiving the plug contact housing of the mount; and a second conductor, a portion of the second conductor being disposed within the reception chamber of the counter-piece, wherein the plug contact housing establishes an electrical connection between the first conductor and the second conductor when the plug contact housing is inserted through the ceiling of the vehicle and into the reception chamber of the counter-piece.

13. The holder of claim 12, wherein the mount further includes a cutout for exposing a portion of the contact spring for establishing the electrical connection between the first conductor and the second conductor.

14. The holder of claim 12, wherein the second conductor comprises a bipolar flat wire.

15. The holder of claim 14, wherein the bipolar flat wire is disposed within the reception chamber such that a non-insulated portion of the bipolar flat wire is positioned toward the reception chamber.

16. The holder of claim 12, wherein the counter-piece further includes a rail section on each side for mounting the counter-piece to the ceiling of the vehicle.

17. The holder of claim 12, wherein the securing arm is mounted to the projection of the mount.

18. A method of making a holder for securing an electrified sun visor to a vehicle, the method comprising the steps of:
- disposing a portion of a first conductor within a securing arm;
- mounting a counter-piece to a cutout in a ceiling of the vehicle by use of a pair of rail sections formed on the sides of the counter-piece, the counter-piece including a reception chamber;
- disposing a portion of a second conductor within the reception chamber of the counter-piece; and
- inserting a plug contact housing of a mount through the cutout in the ceiling of the vehicle and into the reception chamber of the counter-piece,
- whereby the plug contact housing establishes an electrical connection between the first conductor and the second conductor when the plug contact housing is inserted through the ceiling of the vehicle and into the reception chamber of the counter-piece.

* * * * *